(12) United States Patent
Jubin et al.

(10) Patent No.: US 7,036,930 B2
(45) Date of Patent: May 2, 2006

(54) METHODS FOR REDUCING CORNEAL STAINING IN CONTACT LENS WEARERS

(75) Inventors: Philippe F. Jubin, Jacksonville, FL (US); Sheila B. Hickson-Curran, Ponte Vedra Beach, FL (US); Susan W. Neadle, Jacksonville, FL (US); William F. Jones, Jacksonville, FL (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 0 days.

(21) Appl. No.: 10/694,127

(22) Filed: Oct. 27, 2003

(65) Prior Publication Data

US 2005/0088614 A1    Apr. 28, 2005

(51) Int. Cl.
*G02C 7/04* (2006.01)
(52) U.S. Cl. .............................. 351/160 R; 351/160 H; 351/177
(58) Field of Classification Search ............ 351/160 R, 351/160 H, 161, 162, 177
See application file for complete search history.

(56) References Cited

U.S. PATENT DOCUMENTS

| | | | |
|---|---|---|---|
| 4,084,890 A | 4/1978 | Baron | |
| 4,095,878 A | 6/1978 | Fanti | |
| 4,573,774 A | 3/1986 | Sitterle | |
| 4,820,038 A | 4/1989 | Seger et al. | |
| 4,859,049 A | 8/1989 | Muller | |
| 5,020,898 A | 6/1991 | Townsley | |
| 5,100,225 A | 3/1992 | Rothe | |
| 5,532,768 A | 7/1996 | Onogi et al. | |
| 5,971,542 A | 10/1999 | Volker et al. | |
| 6,092,899 A | 7/2000 | Wanders et al. | |
| 6,176,578 B1 * | 1/2001 | Clutterbuck et al. | ..... 351/160 R |
| 6,176,579 B1 * | 1/2001 | Mandell | ..... 351/161 |
| 6,595,639 B1 | 7/2003 | Ho et al. | |
| 2002/0071094 A1 | 6/2002 | Roffman et al. | |

FOREIGN PATENT DOCUMENTS

| | | |
|---|---|---|
| EP | 0440107 B1 | 8/1911 |
| EP | 0741313 A2 | 11/1992 |
| EP | 742462 A2 | 11/1996 |
| EP | 0745876 A2 | 12/1996 |
| EP | 0980015 A1 | 2/2000 |
| EP | 1008890 A1 | 6/2000 |
| EP | 1014156 A1 | 6/2000 |
| GB | 2041557 A | 9/1980 |
| JP | 01187527 A | 7/1989 |
| JP | 11052304 A | 2/1999 |
| JP | 2000214417 A | 8/2000 |
| JP | 2002182167 | 6/2002 |

(Continued)

OTHER PUBLICATIONS

U.S. Appl. No. 10/644,638, Jubin et al.

(Continued)

*Primary Examiner*—Scott J. Sugarman
(74) *Attorney, Agent, or Firm*—Lois Gianneschi

(57) ABSTRACT

The invention provides lenses in which peak pressure under the lens wearer's eyelids is reduced. The invention provides lens designs that reduce or eliminate mechanical chaffing of the cornea even in lenses made of high modulus materials.

9 Claims, 2 Drawing Sheets

FOREIGN PATENT DOCUMENTS

| | | |
|---|---|---|
| WO | WO 01/16641 | 3/2001 |
| WO | WO 01/29608 | 4/2001 |
| WO | WO 01/75509 | 10/2001 |
| WO | WO 03/087920 A1 | 10/2003 |
| WO | WO 04/015480 A1 | 2/2004 |
| WO | WO 04/068214 A1 | 8/2004 |
| WO | WO 04/097502 A1 | 11/2004 |

OTHER PUBLICATIONS

PCT International Search Report, dated Aug. 8, 2005, for PCT Int'l. Appln. No. PCT/US2004/037836.

* cited by examiner

METHODS FOR REDUCING CORNEAL STAINING IN CONTACT LENS WEARERS

FIELD OF THE INVENTION

The invention relates to contact lenses. In particular, the invention provides lenses in which the occurrence of corneal staining in the lens wearer is reduced.

BACKGROUND OF THE INVENTION

The use of contact lenses for the correction of visual acuity, for cosmetic purposes, or both is well known. Soft contact lenses are known, which lenses generally are manufactured from materials including, without limitation, hydrogels and silicone hydrogels.

In normal use on the lens wearer's eye, a portion of the soft contact lens overlies the wearer's cornea. Corneal cell damage that is observable by corneal staining, or upon instillation of a diagnostic dye onto the corneal surface, may occur in soft contact lens wearers. Of particular interest is staining resulting from mechanical chaffing of the lens on the cornea. Such staining is considered a precursor to corneal tissue splitting. Such damage has been observed in wearer's of lathe cut lenses, lenses made from materials having a Young's modulus of 40 psi or greater, lenses with a single back surface curve, and lenses in which the center thickness, the peripheral thickness profile, or cross-sectional thickness, or both is greater than about 0.1 mm.

Additionally, corneal cell damage has been observed in wearer's of lenses having certain geometries on their front or back surfaces. Particularly problematic geometries are those in which junctions between zones on the front or back surface of the lens creates surface discontinuities in the mid-peripheral area of the lens. For purposes of the invention, by mid-peripheral area is meant the non-optical area, outside of the optical zone, between the lens' geometric center and the lens edge, which area overlies the cornea when the lens is on-eye. Typically, this area will have a radius of between about 3.5 and 6.5 mm from the lens' geometric center. Finally, corneal cell damage can result from lenses having areas over which the thickness profile is non-constant.

Corneal staining due to mechanical chaffing is most commonly found in the superior region of the cornea, or the area of the cornea above the pupil, and in the inferior region, or region below the pupil. Thus, the cell damage is most likely to appear in the areas of the cornea that underlie the upper or lower eyelid. The incidence of corneal staining varies from lens to lens based on the material and design of the lens, but can be as high as 50% of lens wearers. Therefore, a need exists for lens designs in which the incidence of corneal staining is reduced or eliminated.

BRIEF DESCRIPTIONS OF THE DRAWINGS

DESCRIPTION OF THE INVENTION AND PREFERRED EMBODIMENTS

The invention provides methods, and lenses produced by such methods, for reducing the incidence of corneal staining in lens wearers. It is believed that corneal staining resulting from mechanical chaffing is most frequently the result of peak pressure on the cornea, meaning that an area of the cornea experiences a higher force imposed by an area of the lens, relative to the adjacent areas of the cornea. Most frequently, these areas of peak pressure occur under the lens wearer's eyelids. Such peak pressure is the result of one or more of the lens' thickness profiles, or cross-sectional thickness, material modulus, and junctions between the zones on the lens' surfaces.

In one embodiment, the invention provides a contact lens comprising, consisting essentially of, or consisting of at least one surface comprising a design wherein a peak pressure is reduced.

One lens design of the invention provides an iso-thickness vertical profile. By "iso-thickness vertical profile" is meant that the radial thickness of the lens' mid-peripheral area as measured between the front and back lens surfaces and along a direction orthogonal to the back surface, is distributed evenly along any meridian within 45 degrees of the vertical meridian (the 90–270 degree axis) of the lens. The iso-thickness vertical profile creates an area around the vertical meridian of the lens in which the cross-sectional thickness of the lens' mid-peripheral area is constant.

Figure 1:
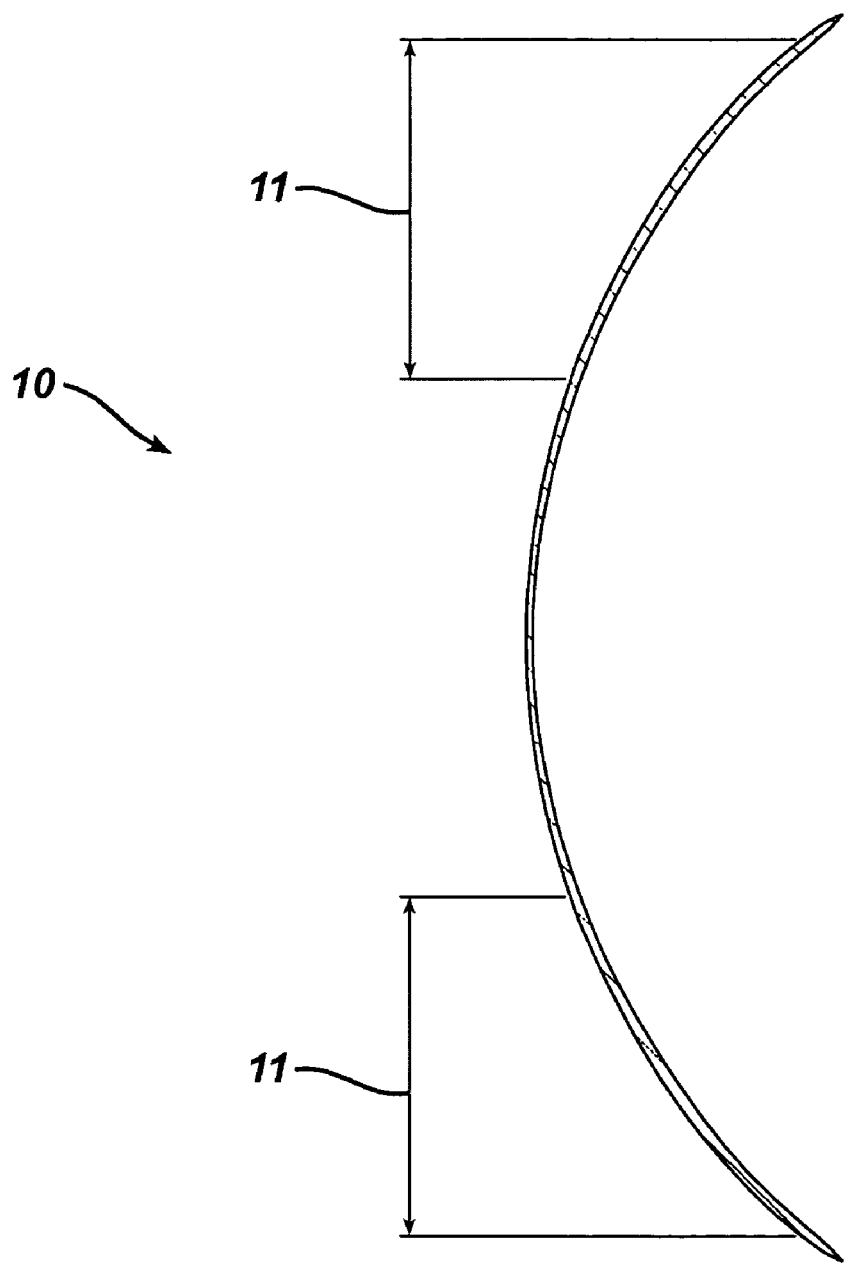
FIG. 1 is a magnified, cross-sectional view of a lens of the invention.
Figure 2:
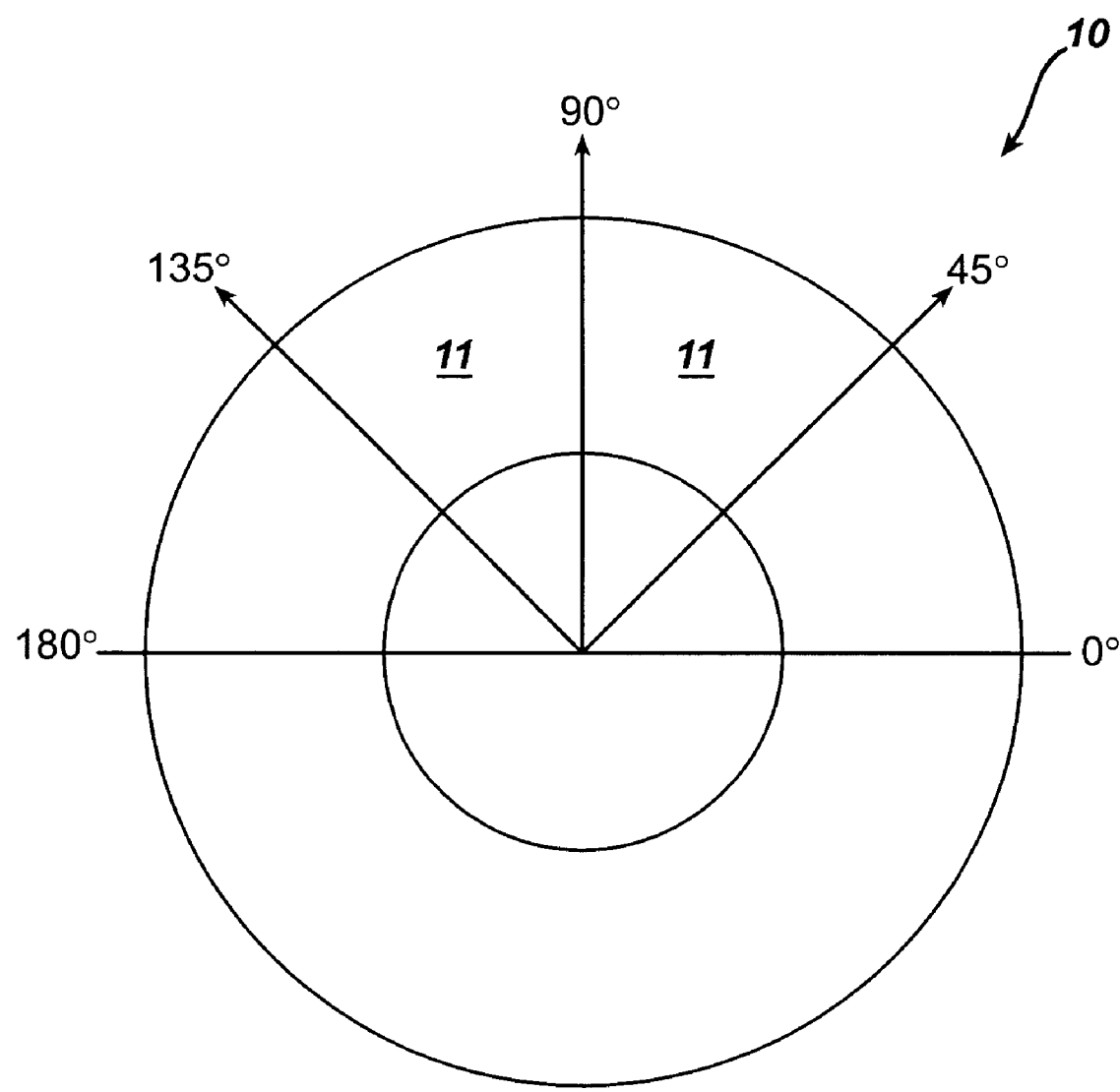
FIG. 2 is a magnified plan view of the front surface of the lens of FIG. 1.

FIG. 1 depicts lens 10 embodying this design. Mid-peripheral areas 11 are shown at the superior (top) and inferior (bottom) portions of the lens in which areas iso-thickness vertical profiles are used. FIG. 2 depicts a plan view of the lens showing the superior-lying area 11.

The iso-thickness vertical profile may be achieved by offsetting the back surface periphery with the front surface periphery to form the desired profile. Such a profile may be obtained by any number of design methods including, without limitation, incorporating off-axis bevel curves or using multiple peripheral zones. Additionally, the design methods of U.S. Pat. No. 6,595,640 may be used, which patent is incorporated herein in its entirety.

As yet another alternative embodiment of the invention, the junctions between the various zones on one or both of the lens' surfaces may be smoothed so as to eliminate slope discontinuities on the back surface. More specifically, in this embodiment the junction between curves on the back surface are such that the first order derivatives, i.e., the slopes of the curves at the junction, are equal. Any number of methods may be used to obtain the smoothed junctions including, without limitation, blending two consecutive zones using conventional mathematical techniques.

The lenses of the invention preferably are rotationally stabilized to maintain their on-eye orientation. Suitable rotational stabilization includes prism stabilization including, without limitation, decentering of the lens' front surface relative to the back surface, prismatic balancing, thickening of the lower lens edge, supporting the lens on the lower eyelid, forming depressions or elevations on the lens' surface away from the 90 degree meridian, and truncating the lens edge. Alternatively, or in combination with prism stabilization, the lens may be dynamically stabilized. Dynamic stabilization includes reducing the thickness of the lens' outer surface at two symmetrically lying regions, thickening two regions in the horizontal center axis, and thinning, or slabbing off, top and bottom zones on the lens. Typically, the areas of stabilization are located in the lenses' periphery meaning the non-optical portion of the lens surrounding the optic zone, but excluding the lens edge or outermost portion of the lens relative to the geometric center.

The invention may be used in designing single vision, multifocal and toric lenses. Additionally, the invention may be used in designing lenses made from any suitable contact lens material. However, the invention may have its greatest utility in lenses that are either or boht rotationally stabilized by use of areas of different thicknesses in the lens' periphery and lenses made from high modulus material, or materials having a Young's modulus of about 40 psi, preferably about 60 psi, or greater.

Exemplary high modulus lens materials include, without limitation hydrogels including, without limitation, etafilcon A. Preferably, the invention is used in lenses made of silicone hydrogels meaning a material containing one or more silicone-containing components and one or more hydrophilic components, such as galyfilcon.

The one or more silicone-containing components and one or more hydrophilic components can be any of the known components used in the prior art to make silicone hydrogels. The terms "silicone-containing component" and "hydrophilic component" are not mutually exclusive, in that, the silicone-containing component can be somewhat hydrophilic and the hydrophilic component can contain some silicone.

A silicone-containing component is one that contains at least one [—Si—O—Si] group, in a monomer, macromer or prepolymer. Preferably, the Si and attached O are present in the silicone-containing component in an amount greater than 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, N-vinyl lactam, N-vinylamide, and styryl functional groups. Examples of silicone-containing components which are useful in this invention may be found in U.S. Pat. Nos. 3,808,178; 4,120,570; 4,136,250; 4,153,641; 4,740,533; 5,034,461 and 5,070,215, and EP080539. All of the patents cited herein are hereby incorporated in their entireties by reference.

Further examples of suitable silicone-containing monomers are polysiloxanylalkyl(meth)acrylic monomers including, without limitation, methacryloxypropyl tris(trimethylsiloxy) silane, pentamethyldisiloxanyl methyhmethacrylate, and methyldi(trimethylsiloxy)methacryloxymethyl silane.

One preferred class of silicone-containing components is a poly(organosiloxane) prepolymer such as α, ω-bis-methacryloxypropyl polydimethylsiloxane. Another preferred example is mPDMS (monomethacryloxypropyl terminated mono-n-butyl terminated polydimethylsiloxane). Another useful class of silicone containing components includes silicone-containing vinyl carbonate or vinyl carbamate monomers including, without limitation, 1,3-bis[4-(vinyloxycarbonyloxy)but-1-yl]tetramethylisiloxane 3-(vinyloxycarbonylthio) propyl-[tris (trimethylsiloxysilane]; 3-[tris(trimethylsiloxy)silyl] propyl allyl carbamate; 3-[tris(trimethylsiloxy)wilyl] propyl vinyl carbamate; trimethylsilylethyl vinyl carbonate; and trimethylsilylmethyl vinyl carbonate.

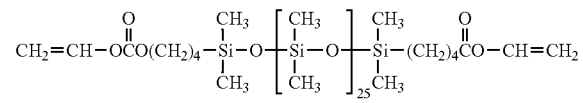

Hydrophilic components include those which are capable of providing at least about 20% and preferably at least about 25% water content to the resulting lens when combined with the remaining reactive components. Suitable hydrophilic components may be present in amounts between about 10 to about 60 weight % based upon the weight of all reactive components. About 15 to about 50 weight % and more preferably between about 20 to about 40 weight %. The hydrophilic monomers that may be used to make the polymers of this invention have at least one polymerizable double bond and at least one hydrophilic functional group. Examples of polymerizable double bonds include acrylic, methacrylic, acrylamido, methacrylamido, fumaric, maleic, styryl, isopropenylphenyl, O-vinylcarbonate, O-vinylcarbamate, allylic, O-vinylacetyl and N-vinyllactam and N-vinylamido double bonds. Such hydrophilic monomers may themselves be used as crosslinking agents. "Acrylic-type" or "acrylic-containing" monomers are those monomers containing the acrylic group (CR'H=CRCOX) wherein R is H or $CH_3$, R' is H, alkyl or carbonyl, and X is O or N, which are also known to polymerize readily, such as N,N-dimethylacrylamide (DMA), 2-hydroxyethyl acrylate, glycerol methacrylate, 2-hydroxyethyl methacrylamide, polyethyleneglycol monomethacrylate, methacrylic acid, acrylic acid and mixtures thereof.

Hydrophilic vinyl-containing monomers which may be incorporated into the hydrogels of the present invention include monomers such as N-vinyl lactams (e.g. N-vinyl pyrrolidone (NVP)), N-vinyl-N-methyl acetamide, N-vinyl-N-ethyl acetamide, N-vinyl-N-ethyl formamide, N-vinyl formamide, N-2-hydroxyethyl vinyl carbamate, N-carboxy-β-alanine N-vinyl ester, with NVP being preferred.

Other hydrophilic monomers that can be employed in the invention include polyoxyethylene polyols having one or more of the terminal hydroxyl groups replaced with a functional group containing a polymerizable double bond. Examples include polyethylene glycol with one or more of the terminal hydroxyl groups replaced with a functional group containing a polymerizable double bond. Examples include polyethylene glycol reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No.5, 070,215, and the hydrophilic oxazolone monomers disclosed in U.S. Pat. No. 4,190,277. Other suitable hydrophilic monomers will be apparent to one skilled in the art. More preferred hydrophilic monomers which may be incorporated into the polymer of the present invention include hydrophilic monomers such as N,N-dimethyl acrylamide (DMA), 2-hydroxyethyl acrylate, glycerol methacrylate, 2-hydroxyethyl methacrylamide, N-vinylpyrrolidone (NVP), and polyethyleneglycol monomethacrylate. Most preferred hydrophilic monomers include DMA, NVP and mixtures thereof.

Curing of the lens material may be carried out by any convenient method. For example, the material may be deposited within a mold and cured by thermal, irradiation, chemical, electromagnetic radiation curing and the like and combinations thereof. Preferably, molding is carried out using ultraviolet light or using the full spectrum of visible light. More specifically, the precise conditions suitable for curing the lens material will depend on the material selected and the lens to be formed. Suitable processes are disclosed in U.S. Pat. Nos. 4,495,313, 4,680,336, 4,889,664, 5,039, 459, and 5,540,410 incorporated herein in their entireties by reference.

The contact lenses of the invention may be formed by any convenient method. One such method uses a lathe to produce mold inserts. The mold inserts in turn are used to form molds. Subsequently, a suitable lens material is placed between the molds followed by compression and curing of the resin to form the lenses of the invention. One ordinarily skilled in the art will recognize that any other number of known methods may be used to produce the lenses of the invention.

What is claimed is:

1. A contact lens, comprising at least one surface comprising at least one iso-thickness vertical profile in a mid-peripheral area of the lens, wherein a peak pressure is reduced.

2. The lens of claim 1, wherein the Young's modulus is about 40 psi or greater.

3. A contact lens, comprising at least one surface having at least two curves of different slopes with a junction therebetween, wherein the slopes of the curves at the junction are equal and wherein a peak pressure is reduced.

4. The lens of claim 3, wherein the Young's modulus is about 40 psi or greater.

5. The lens of claim 1, 3, 4, 2, or 4 further comprising rotational stabilization.

6. The lens of claim 5, wherein the rotational stabilization comprises two symmetrically lying regions in the lens' periphery in which the lens' thickness is reduced as compared to the remainder of the lens periphery.

7. The lens of claim 6, wherein the lens is a toric lens.

8. A method of designing a contact lens comprising the step of providing at least one iso-thickness vertical profile in a mid-peripheral area of the lens to reduce a peak pressure.

9. A method of designing a contact lens comprising the step of providing a surface having at least two curves of different slopes with a junction therebetween, wherein the slopes of the curves at the junction are equal to reduce a peak pressure.

* * * * *